US00RE37301E

(19) United States
(12) Reissued Patent
Lo

(10) Patent Number: US RE37,301 E
(45) Date of Reissued Patent: Jul. 31, 2001

(54) MULTIPLE ACCESS PROTOCOL

(75) Inventor: Wing F. Lo, Plano, TX (US)

(73) Assignee: Nortel Networks Limited, Montreal (CA)

(21) Appl. No.: 09/235,576

(22) Filed: Jan. 22, 1999

Related U.S. Patent Documents

Reissue of:
(64) Patent No.: 5,166,929
Issued: Nov. 24, 1992
Appl. No.: 07/539,832
Filed: Jun. 18, 1990

(51) Int. Cl.[7] ..... H04J 3/16; H04B 7/00
(52) U.S. Cl. ..... 370/448; 370/348; 370/443; 370/447; 370/450; 370/459; 455/450; 455/38.1; 455/509; 455/517
(58) Field of Search ..... 370/329, 336, 370/337, 345, 347, 348, 442, 443, 445, 447, 448, 449, 450, 461, 462, 459; 340/825.44; 455/450, 451, 452, 38.1, 507, 509, 517

(56) References Cited

U.S. PATENT DOCUMENTS 4,352,955 * 10/1982 Kai et al. ..... 370/314
4,356,484 * 10/1982 Eckhardt ..... 340/825.03
4,477,809 * 10/1984 Bose ..... 340/825.07
4,612,637 * 9/1986 Davis et al. ..... 370/348
4,704,734 * 11/1987 Menich et al. ..... 455/562
4,736,371 * 4/1988 Tejima et al. ..... 370/236
4,759,016 * 7/1988 Otsuka ..... 370/347
4,774,707 * 9/1988 Raychaudhuri ..... 370/447
4,774,708 * 9/1988 Hotta ..... 370/321
4,866,788 * 9/1989 Mouly et al. ..... 455/9
4,987,571 * 1/1991 Haymond et al. ..... 370/445

OTHER PUBLICATIONS

Datapro Research Corporation, "An Overview of Cellular Telephone Service", Apr. 1988.*

* cited by examiner

*Primary Examiner*—Alpus H. Hsu

(57) ABSTRACT

The mobile station to base station access in a cellular radio system is a classical problem of random multiple access using a shared common channel. Many multiple access protocols have been invented in the past with varied degrees of success in improving the throughput of the multiple access channel. The current invention is a new multiple access protocol which enhances the throughput and reduces the access delay by providing feedback of the detailed status of the access channel from the base station to the mobile station. The feedback mechanism and multiple access protocol are also applicable to other types of radio or wire-based channels.

5 Claims, 6 Drawing Sheets

MULTIPLE ACCESS PROTOCOL

Matter enclosed in heavy brackets [ ] appears in the original patent but forms no part of this reissue specification; matter printed in italics indicates the additions made by reissue.

BACKGROUND OF THE INVENTION

Many multiple access schemes have been devised to allow a group of terminals to communicate with a central station using a shared channel. One of these schemes, called random multiple access, relies on randomly transmitted messages from a group of terminals to a central station without perfect coordination between terminals. For example, in a cellular radio environment, each cell is served by a base station communicating with multiple mobile stations. Each cell has the use of a set of radio frequency channels. At least one channel is dedicated for the purpose of setting up radio phone calls in each cell. This "setup" channel is shared by all the mobile stations to communicate with the base station. The setup channel is a full duplex channel with separate frequencies in the forward (base to mobile) and reverse (mobile to base) directions. The forward setup channel is used by the base station to transmit messages to all the mobiles. This channel is a broadcast channel in which all the mobile stations can receive all the messages transmitted from the base station. The reverse channel is a random contention multiple access channel, in which mobile stations may transmit messages to the base station with relatively little coordination. The access is random in the sense that mobile stations are not assigned a fixed transmission schedule. The access is based on contention in which mobile stations with messages to transmit will try to seize channel openings as the appear. If multiple mobile stations decide to transmit at the same time, the messages may collide and mutually destroy each other. There is also a possibility that one of the messages is received with significantly higher power than the others and is correctly received at the base station. In any case the mobile stations whose transmissions are not successful have to retransmit after some random delay.

DESCRIPTION OF THE PRIOR ART

Existing multiple access protocols of this sort include the ALOHA, CSMA, ICSMA-CD access protocols, among others. Because of the random transmission nature and inevitable collisions that may occur, no random access protocols can reach 100% throughput efficiency. The random delay after a collision also introduces additional messaging delay between a terminal and a central station.

In the North American analog cellular system the base station and mobile stations transmit on separate frequencies to form a full duplex channel. The base station broadcasts the status of the multiple access setup channel to all the mobiles communicating with base periodically. A busy/idle bit inserted every 11 bits in the base to mobile transmission indicates if the mobile station (terminal) to base station multiple access channel was busy or idle in the last period. Such timely feedback enables a mobile station to make sure the channel is idle before transmitting again. A mobile station continues to monitor the busy/idle bit during transmission. If the busy/idle bit does not change from indicating idle to indicating busy within a short window at the beginning of a message transmission, the transmitting mobile station assumes a collision and the transmission is immediately aborted. However, the problem associated with this approach is that the busy/idle bit does not distinguish between a collision state and a real idle state. Without such information, the mobile station cannot make more efficient decisions on when to start or abort a transmission. Many of the multiple access protocols have a slotted variation. In a slotted protocol, the channel is divided into fixed size time slots. In the slotted ALOHA protocol, each slot is long enough to include a fixed size message. A variation of the slotted ALOHA called Reservation ALOHA allows a message of multiple slots (words) in length to be transmitted without interruption once the first word of the message is successfully transmitted. In Reservation ALOHA, if a station has successfully transmitted in a predetermined time slot, all the subsequent slots are implicitly reserved for that station until the station stops transmission. The problem with this scheme is that is expands one idle slot to indicate the channel's relinquishment. Such use of channel resources is inefficient.

There is accordingly a need for a new multiple access protocol which will enhance transmission efficiency, while reducing the access delay.

Accordingly, it is an object of the present invention to provide a new access protocol which improves transmission efficiency, while reducing access delay.

Another object of the present invention is to provide a new multiple access protocol in which a short data field is used to send feedback information from the central station to terminals providing information on the status of the access channel.

Yet another object of the present invention is to provide a new multiple access protocol in which a short data field is used in every base to mobile station burst to indicate the relinquishment of the multiple access channel and eliminates the necessary idle slot between messages.

SUMMARY OF THE INVENTION

The new access protocol of the present invention utilizes a feedback field to provide the status of the multiple access channel from the base station to the transmitting mobile station to improve performance. This feedback information identifies the outcome of the last mobile to base transmission slot as being either idle, containing one successful transmission, or a collision.

In the case of a field containing one successful transmission, the feedback information also identifies the transmitting mobile station. The detailed feedback information allows all mobiles to make between decisions regarding whether to start a new message transmission or to continue transmission of the current message. This will in turn improve the throughput and delay performance of the protocol.

The current invention also uses a short field in every base to mobile station burst to indicate if the multiple access channel is open for contention in the next slot. This eliminates the necessary idle slot between messages and further enhances the throughput and delay performance of the protocol, especially at transmitting short messages.

Accordingly, it is an aspect of the present invention to provide a method of providing feedback information indicative of the status of a multiple access channel between a group of terminals and a central station, comprising the step of:

forwarding on said access channel, from said central station to said terminals, an information code indicative of the status of said channel and of the outcome of the last terminal to central station message transmission.

According to another aspect of the present invention, there is provided a transmission protocol for providing feedback information indicative of the status of a multiple access channel between a group of terminals and a central station, comprising:

an information code transmitted on said access channel between said central station and said terminals, said information code being indicative of the status of said access channel and of the outcome of the last terminal to central station message transmission.

DESCRIPTION OF THE PREFERRED EMBODIMENT

As indicated above, in a cellular radio environment each cell is served by a base station communicating with multiple mobile stations. The setup channel is a full duplex channel with separate frequencies in the forward (base to mobile) and reverse (mobile to base) directions. The forward setup channel is used by the base station to transmit messages to the mobiles. This channel is a broadcast channel in which all the mobile stations can receive all the messages transmitted from the base station. The reverse channel is a random contention multiple access channel, in which mobile stations may transmit messages to the base station with relatively little coordination.

Figure 1:
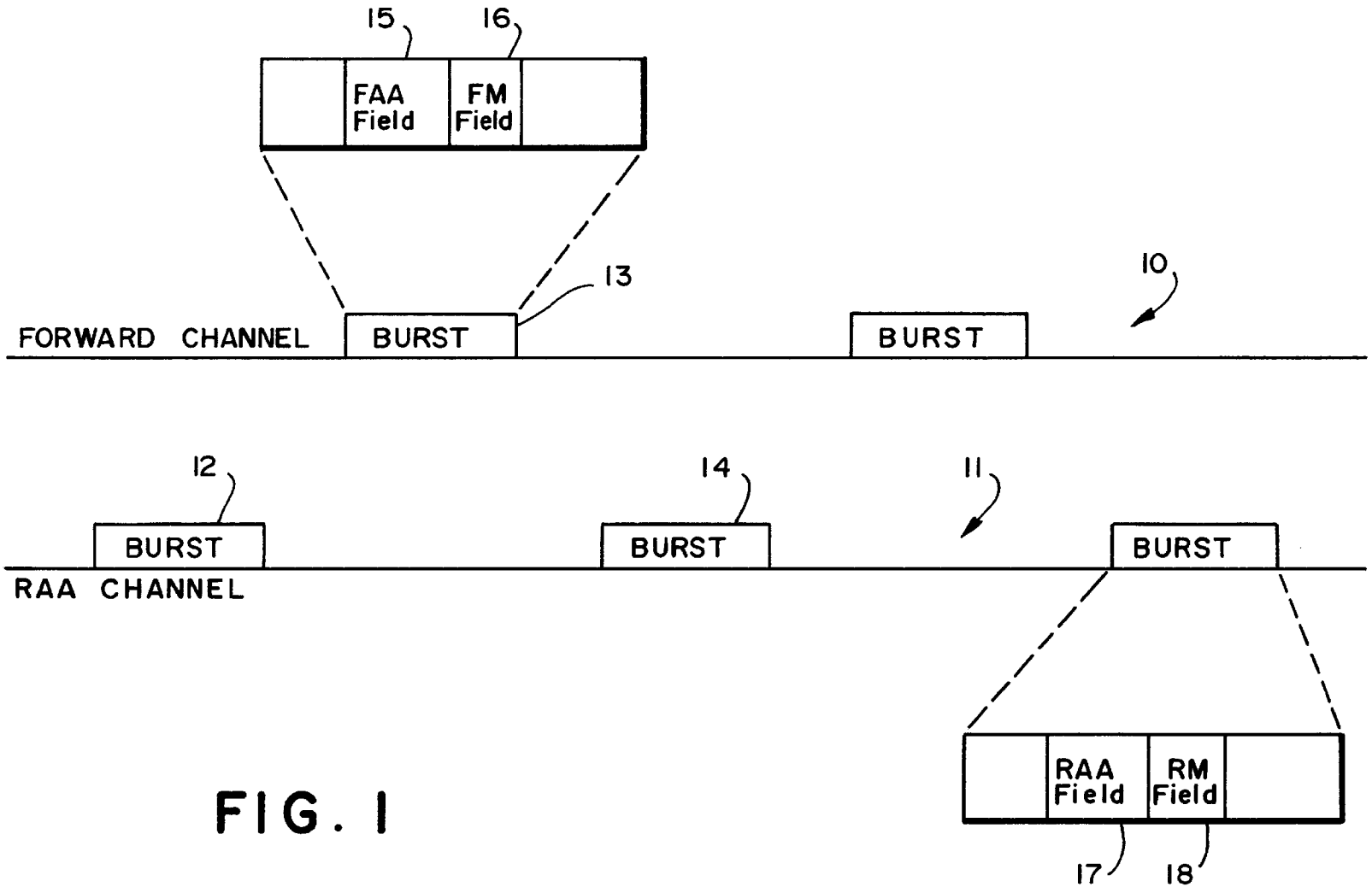
FIG. 1 is an illustration showing the relative timing of forward and reverse channel transmission bursts according to the access protocol of the present invention.

In the present embodiment of the invention, a new multiple access protocol is used in the setup channel. As shown in FIG. 1, both the forward channel 10 and reverse channel 11 are divided into timeslots. The forward and reverse channel time slots are arranged in such a way that after a mobile station transmits a burst 12 on reverse channel 1, an acknowledgement burst 13 from the base station will be transmitted and received by the mobile station before the mobile transmits burst 14. The time slots need not occupy the complet channel, Duration not used by the forward or reverse channel can be allocated to other services or form other pairs of time division multiple access channels.

For each burst of transmission in both directions, two fields are used to support the multiple access protocol. In the forward direction, these are the forward access/acknowledgement (FAA) field 15 and the forward "more" (FAA) field 16. In the reverse direction, these are the reverse access/acknowledgement (RAA) field 17 and the reverse "more" (RM) field 18. In the reverse channel, the RAA field carries an abbreviated identifier of the mobile station. This identifier need not uniquely identify the mobile station as long as the probability of mis-identification is much less than the probability of correct identification. If the identifier in the RAA field does not uniquely identify the transmitting mobile station, the rest of the message must contain a full identifier which will uniquely identify the mobile station. Messages in either direction may be of one or more bursts (words). The RM is a binary field which is set of Open if the current message is not continued on the next burst, otherwise the RM is set to Reserved.

In the forward direction, the FAA field is sued to reflect the result of access in the last received slot in the reverse channel. If the last received slot i the reverse channel contained a successful transmission burst, the FAA will provide an acknowledgement code which is the same as the content of the RAA field of the last slot received by the base station. If the last reverse channel slot received is idle, the FAA will contain a distinct idle code which is different from all possible abbreviated identities of mobiles. If multiple mobile stations transmitted in the last reverse channel slot resulting in mutual destruction of the collided messages, a distinct Collision code which is different from all possible abbreviated mobile identifies will be transmitted.

The FM field holds a the binary value representing either an Open or Reserved state. The value or state representing Open indicates the next reverse channel slot is available for contention access. The value representing Reserved indicates the next reverse channel slot is reversed for the mobile station whose abbreviated identifier is transmitted in the FAA field of the current forward burst. The base station will set the FAA and FM Fields according to the result of the last reversed slot, as follows:

| Last Reverse Access Channel Slot Status | RM | FM | FAA |
|---|---|---|---|
| Idle | n/a | Open | Idle Code |
| Single Successful | Open | Open | Abbr. Identifier |
| Transmission | Reserved | Reserved | Abbr. Identifier |
| Multiple | Open | Open | Abbr. Identifier |
| Transmission With one success | Reserved | Reserved | Abbr. Identifier |
| Multiple Transmission without success | X | Open | Collision Code |
| Transmission by radio channel errors | X | Open | Collision Code |

n/a indicates not applicable.
X indicates don't care.

A mobile station with a message to send to the base station will use the following algorithm to determine when to transmit, as best shown in FIG. 2(*d*);

1) Wait until the FM field indicates the next slot is open for contention.

2) Transmit the first word of the message in the next reverse slot with RAA set to the mobile station's abbreviated identifier.

3) in the next forward burst check if the FAA field is equal to the mobile station's abbreviated identifier,

| | |
|---|---|
| if true | continue to transmit the current message in the consecutive reverse slots. |
| if false | abort the transmission of the rest of the message and wait a random period according to some retransmission algorithm. go to step 1 and try again. |

As an example of implementation, the FAA can be assigned a 7-bit field which can hold an arbitrary value ranging from 0 to 127 (decimal). The abbreviated identifier uses the last two digits of the telephone number of a mobile station. The valid abbreviated identifier therefore can range between 00 (decimal) to 99 (decimal). The idle and Collision codes for the FAA field must be set to number that are greater than 99, since numbers 00 to 99 are reserved for abbreviated identifiers. In this embodiment, an idle code field number of 120 (decimal) and a collision code filed number of 127 (decimal) is used. It will be understood by those knowledgeable in this art that the above idle and collision codes are arbitrary and may be assigned differently. The RAA field can have the same-length as the FAA with a valid abbreviated identifier range of 0 to 99 decimal. Both the RM and FM can be assigned a one bit filed with 0 indicating Open and 1 indicating Reserved.

FIG. 2(*a*) shows a successful transmission of bursts without collisions. In the forward channel 20, bursts 21 and 22 are transmitted and received to and by mobile stations A, B and C. Mobile A sends a burst 23 to the base station. It contains an abbreviated identifier RAA=72 i.e. The mobile's last two telephone number digits and a reverse field RM=0 indicating only one burst is sent. In the acknowledgement burst 24 sent by the base station, on the forward channel, the FAA filed indicates that transmission was received since station's A abbreviated identifier is transmitted. The FM field is set to 0 indicating to all mobiles that the next reverse channel slot is available for contention access since only one burst was to be sent by station A. Upon receiving burst 24 from the forward channel, mobile station B identifies that the reverse channel is available and sends a burst 25 having a field with the identifier RAA=37 and RM=1. A field with RM =1 indicates that at least one additional burst will be transmitted. The next burst 26 sent on the forward channel 20 by the base station includes an acknowledgement field identifier FAA=37 and a reserved field FM=1 indicating to all mobiles that the next burst is reserved for the mobile with ID 37. Upon receiving burst 26, mobile station B identifies that the previous burst was successfully received by the base station and sends burst 27, again including the identifier RAA =37 and reserved field RM =1. The base station responds again in the forward channel with a similar burst 28. Mobile station B sends it last burst 29 for that message. The burst includes the same identifier field RAA=37 but includes a field RM=0 indicating that again the next reverse channel slot will be available for contention access. The base station responds with a burst 30 indicating to all mobiles that the next reverse channel slot is now available for contention access. If no mobile station sends a burst, the next two bursts 31 and 32 from the base station indicate the status of the channel as being idle.

FIG. 2(*b*) shows a burst transmission scenario in which a collision destroys messages from mobile station B and C. A subsequent successful retransmission of the messages is also shown. Upon receiving burst 40 from the base station indicating that the channel is idle, station B sends burst 41 and station C sends burst 42. Since both are sent simultaneously, a collision occurs resulting in destruction of the bursts. At the base station, a stats burst 43 indicating that a collision has occurred is transmitted. Upon receipt of burst 43, transmission from both mobiles is terminated. After a randomly selected delay, both mobile stations will try a retransmission of a burst. In the example of FIG. 2(*b*), mobile station C is the first to retransmit its burst after identifying that the channel is IDLE again. In this example, a one-word message is sent by station C. Again after a random delay, mobile B sends its message, which consist of a two-word message, i.e. bursts 44 and 45.

FIG. 2(*c*) shows a burst transmission in which a prospective collision event results in the successful transmission of one message to the base station but the loss of the other burst. This is reflected in the next burst transmitted by the base station with the FAA code set to the abbreviated identifier of the successful mobile station (i.e. station A). The above scenario can occur even though both messages where sent at the same time. This is possible if the burst of one station is of much greater relative power than that of the other station. The burst from the station having lower power will be discarded as noise by the base station.

Figure 2A:
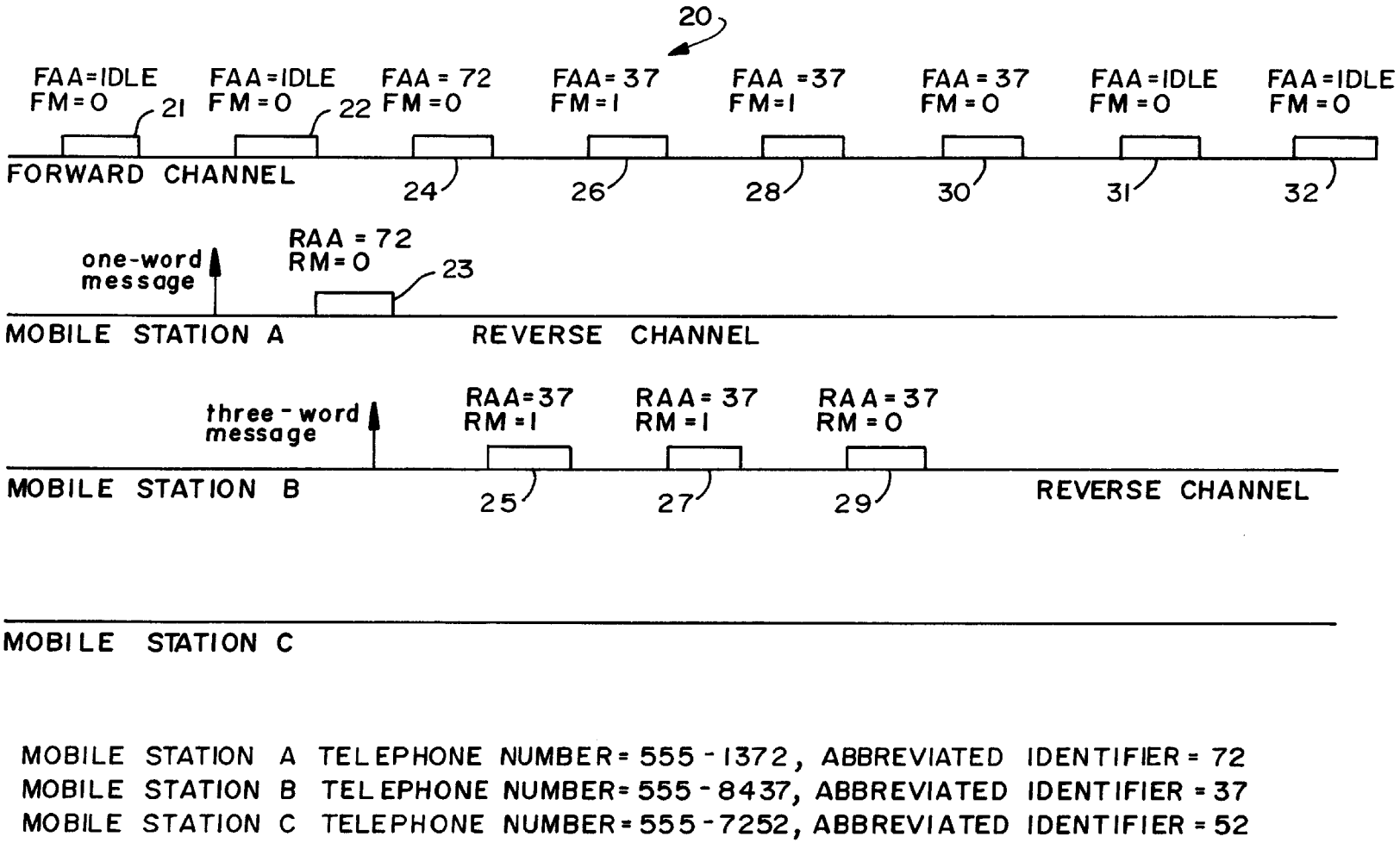
FIG. 2*a* is an illustration showing a successful burst transmission without collision on the reverse channel.
Figure 2B:
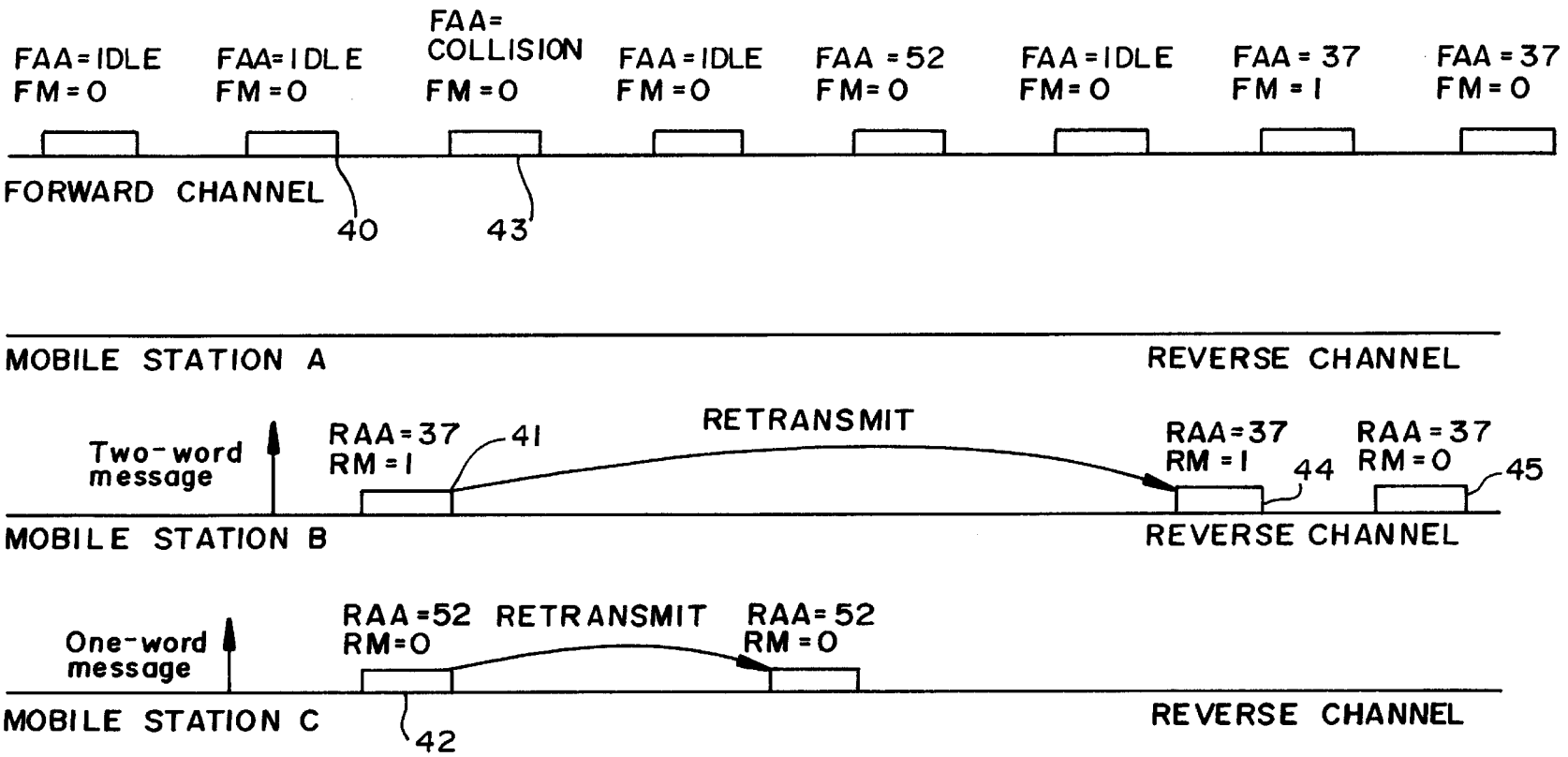
FIG. 2*b* is an illustration of a burst transmission resulting in collision of bursts from two terminals, followed by a successful retransmission.
Figure 2C:
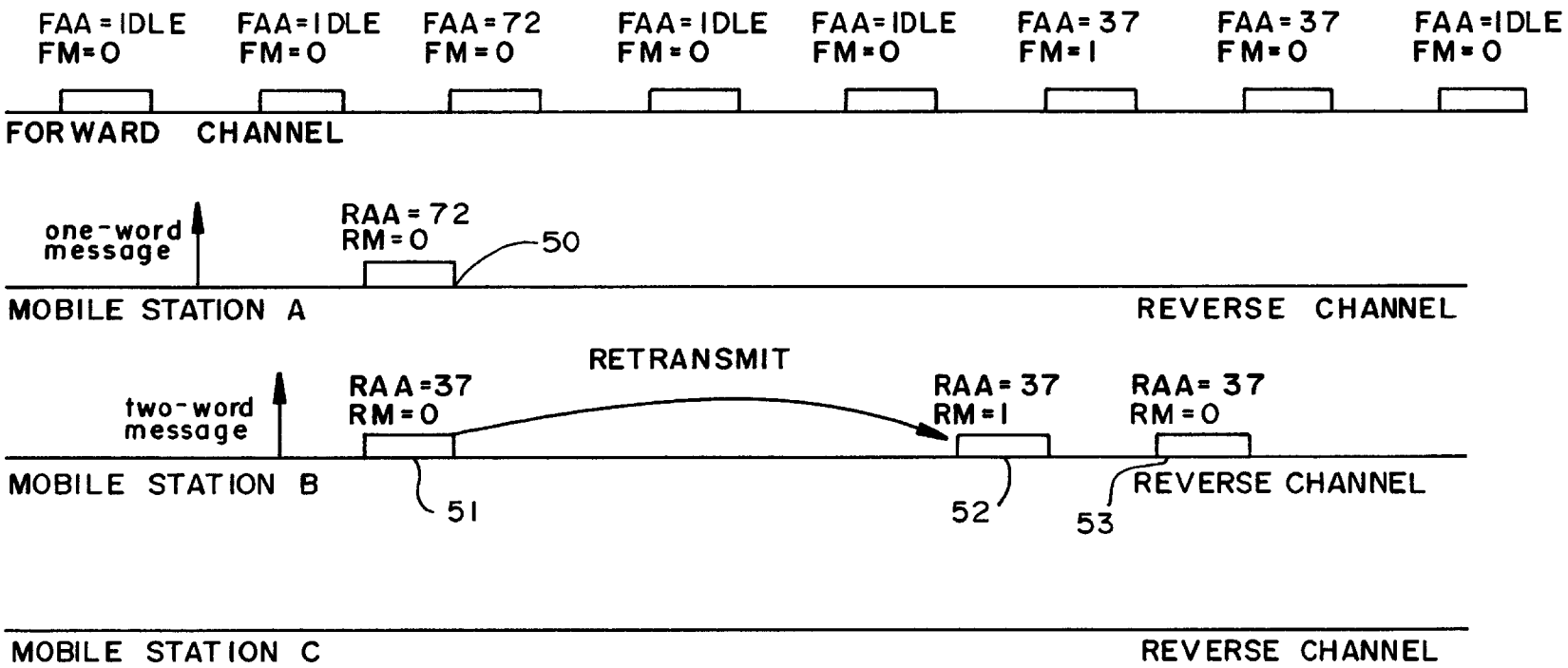
FIG. 2*c* is an illustration of burst transmission with one successful and unsuccessful transmission, with retransmission after random delay by the unsuccessful terminal.
Figure 2D:
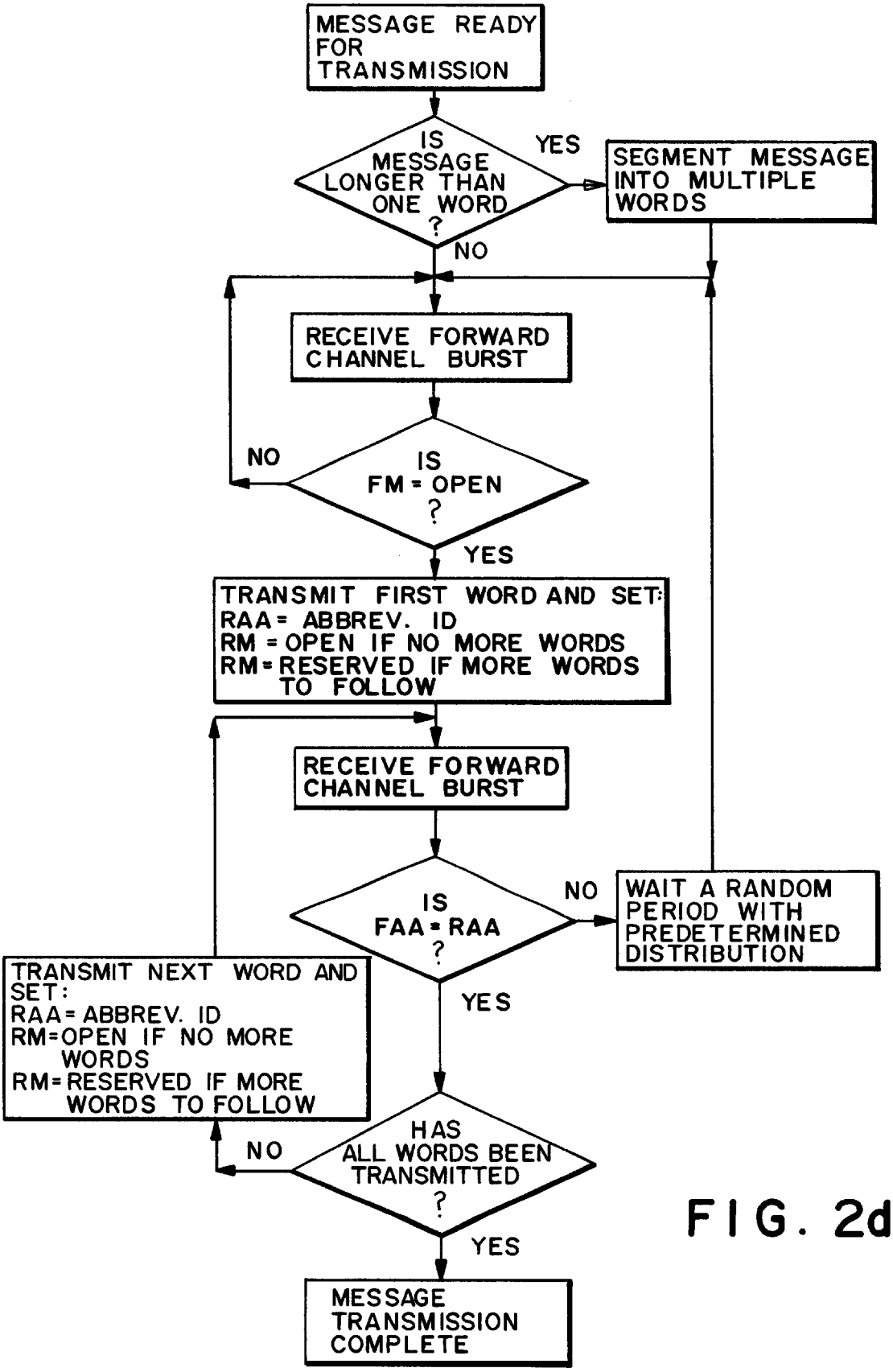
FIG. 2*d* is a flow chart of the present invention showing the method used by a mobile station to transmit a message to the base station.

In FIG. 2(C), station A transmits burst 50 and station B transmits burst 51. Since the base station's acknowledgement burst includes identifier 72, station A identifies a successful transmission. However, station B identifies an unsuccessful transmission and therefore terminates the transmission of its second burst. After a random delay, mobile station B will retransmit its message, i.e. bursts 52 and 53.

Figure 3:
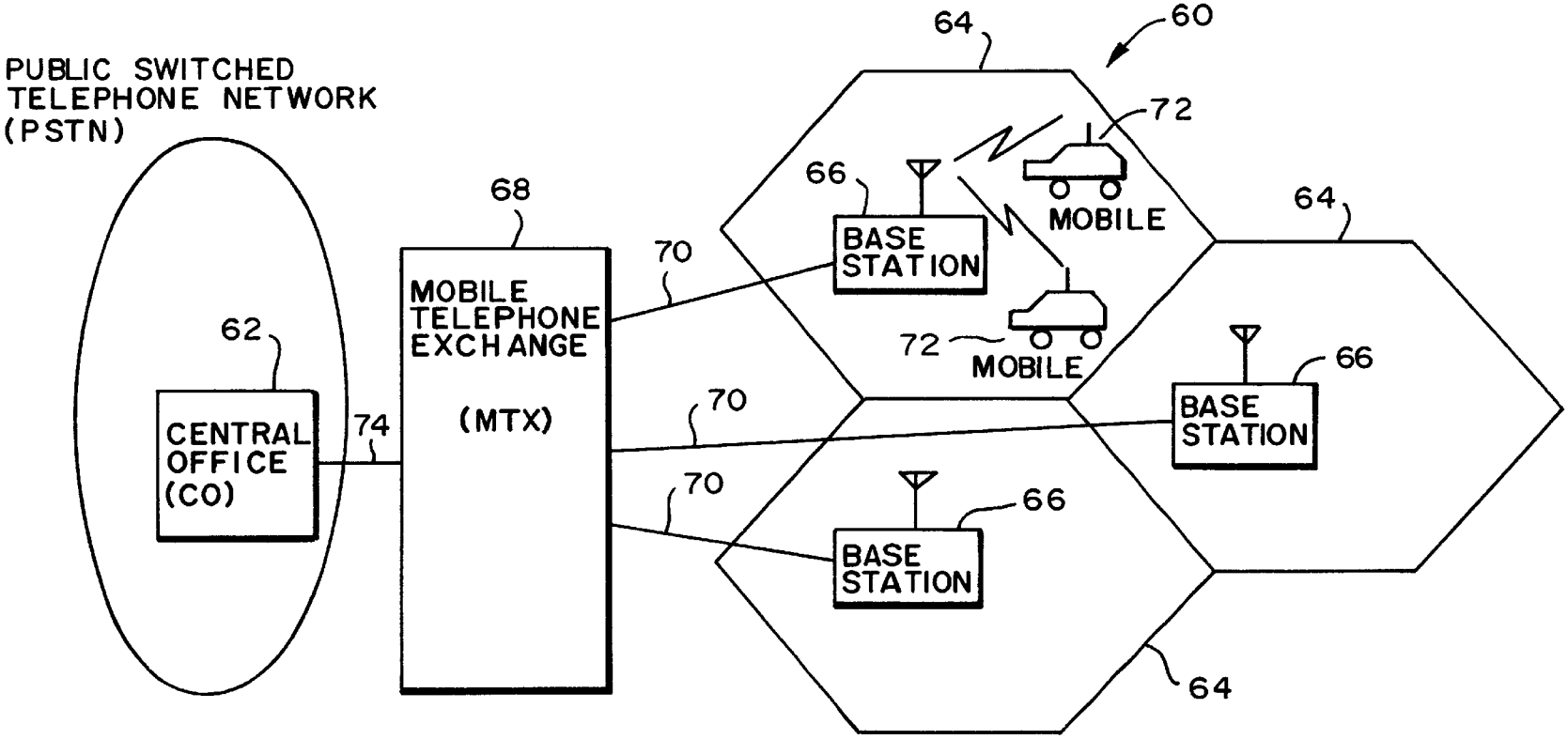
FIG. 3 is an illustration of the use of the new protocol where multiple access channels are being used.

A typical cellular system 60 in which the present invention may be used is disclosed in FIG. 3. The cellular system 60 is connected to a public telephone network central office (CO) 62. The area served by the cellular system 60 is typically divided into multiple cells 64. Each cell 64 is served by a base station 66. The base stations 66 are connected to a mobile telephone exchange (MTX) 68 via trunk lines 70 that are used to carry both traffic and signaling information. Each cell 64 serves a large number of mobile stations 72 of which only a small fraction would be engaged in conversation at any one time. The mobile telephone exchange 68 is connected to the central office 62 via a trunk line 74.

The present invention is used in the set-up channel between the base station 66 and a mobile station 72. Similarly, it could be used in the communication access channel of trunk line 70 between base station 66 and the mobile telephone exchange 68. Also, between MtX 68 and the central office 62. The protocol of the present invention is thus not limited to either wire or wireless based communication access channels. Therefore, it will be understood to those knowledgeable in the art that, while the invention has been described with reference to a particular embodiment, modifications may be made without departing from the spirit or scope of the present invention.

I claim:

1. A method for transmitting a message in a multiple access channel from one of a plurality of remote stations to a central station, the multiple access channel including a forward channel and a reverse channel, each of the forward and reverse channels including mutually offset time slots for transmission. such that the central station or the remote stations do not transmit and receive at the same time, said method comprising the steps of:

a) transmitting from the central station to the plurality of remote stations a status of the next [forward] *reverse* channel time slot, the status being open if the next [forward] *reverse* channel time slot is open for contention and reserved if the next [forward] *reverse* channel time slot is reserved for a specific remote station;

b) monitoring by the one remote station of the last forward channel slot until an open status is detected;

c) transmitting the message to the central station from the one remote station on the next reverse channel slot when the open status is detected;

d) transmitting successful transmission status or collision status from the central station to the plurality of remote stations if the transmission in the last reverse channel slot was received successfully or in error, respectively;

e) detecting by the one remote station of the last forward channel slot in step (d) for successful status or collision status;

f) continuing to transmit the message when a successful status is detected in step (e) and repeating the steps starting at step (c) until the message is completely transmitted;

g) terminating transmission of the message if a collision status in step (e) is detected; and h) waiting for a random period and repeating the steps starting at step (b) if a collision status is detected.

2. A method as in claim 1, and further comprising the steps of:

a) providing a first information code in each forward channel time slot comprising first and second fields to indicate the status of the last transmission by the one remote station and the status of the next [forward] *reverse* channel time slot, respectively; and b) providing a second information code in each reverse channel time slot comprising third and fourth fields to indicate the identity of the one transmitting remote station and to indicate whether the one remote station will continue to transmit in the next reverse channel slot, respectively.

3. A method as in claim 2, and further comprising the step of:

a) setting the first field equal to the third field to indicate successful transmission.

4. A method as in claim 2, and further comprising the step of:

a) setting the second field equal to the fourth field.

5. A method as in claim 2, and further comprising the step of:

a) setting the last two digit of the remote station telephone number equal to the third field.

* * * * *